US012325248B2

(12) United States Patent
Tachihara

(10) Patent No.: US 12,325,248 B2
(45) Date of Patent: Jun. 10, 2025

(54) RECORDING APPARATUS

(71) Applicant: CANON FINETECH NISCA INC., Misato (JP)

(72) Inventor: Yuji Tachihara, Nagareyama (JP)

(73) Assignee: Canon Finetech Nisca Inc., Misato (JP)

(*) Notice: Subject to any disclaimer, the term of this patent is extended or adjusted under 35 U.S.C. 154(b) by 0 days.

(21) Appl. No.: 18/525,969

(22) Filed: Dec. 1, 2023

(65) Prior Publication Data

US 2024/0109352 A1 Apr. 4, 2024

Related U.S. Application Data

(63) Continuation of application No. 17/639,358, filed as application No. PCT/JP2020/039745 on Oct. 22, 2020, now abandoned.

(30) Foreign Application Priority Data

Oct. 25, 2019 (JP) ................................ 2019-194621
Sep. 25, 2020 (JP) ................................ 2020-161217

(51) Int. Cl.
*B41J 29/13* (2006.01)
*B41J 19/60* (2006.01)
*B41J 19/76* (2006.01)

(52) U.S. Cl.
CPC ................ *B41J 29/13* (2013.01); *B41J 19/60* (2013.01); *B41J 19/76* (2013.01)

(58) Field of Classification Search
CPC ... B41J 29/13; B41J 19/60; B41J 19/76; B41J 2/17566; B41J 29/02

(Continued)

(56) References Cited

U.S. PATENT DOCUMENTS 5,828,389 A 10/1998 Yamaguchi et al.
10,661,588 B2 5/2020 Tachihara
(Continued)

FOREIGN PATENT DOCUMENTS

JP H09-277602 A 10/1997
JP H10-016302 A 1/1998
(Continued)

OTHER PUBLICATIONS

Jan. 12, 2021 International Search Report and Written Opinion in Int'l Patent Appln. No. PCT/JP2020/039745.
(Continued)

*Primary Examiner* — Jason S Uhlenhake
*Assistant Examiner* — Alexander D Shenderov
(74) *Attorney, Agent, or Firm* — Venable LLP

(57) ABSTRACT

A configuration which improves workability when performing maintenance. A recording apparatus 100 includes a recording head H, a main carriage 21 movable along a first direction X1, X2, a sub-carriage 22 held by the main carriage 21, and a regulating portion which regulates a movement of a recording medium P inserted into the recording apparatus 100 in a second direction Y1, Y2. The sub-carriage 22 is moved along the first direction in association with a movement of the main carriage 21, and is movable to a first position and to a second position along the second direction relative to the main carriage 21. The shortest distance between the regulating portion and discharge ports of the recording head H with respect to the second direction when the sub-carriage 22 is in the second position is larger than that when the sub-carriage 22 is in the first position. An operation of removing the recording head H from the sub-carriage 22 is performed in a state in which the sub-carriage 22 is in the second position with respect to the second direction.

4 Claims, 12 Drawing Sheets

(58) Field of Classification Search
USPC .......................................................... 347/108
See application file for complete search history.

(56) References Cited

U.S. PATENT DOCUMENTS

| | | | | |
|---|---|---|---|---|
| 2001/0015743 | A1 | 8/2001 | Okura et al. | |
| 2002/0001496 | A1 | 1/2002 | Ford | |
| 2003/0063177 | A1 | 4/2003 | Yoshimura et al. | |
| 2004/0227788 | A1* | 11/2004 | Katayama | B41J 2/17553 347/50 |
| 2005/0152726 | A1 | 7/2005 | Ueda et al. | |
| 2011/0242249 | A1* | 10/2011 | Yazawa | B41J 2/17566 347/108 |
| 2012/0038708 | A1* | 2/2012 | Ishii | B41J 2/175 347/40 |
| 2019/0193442 | A1 | 6/2019 | Tachihara | |

FOREIGN PATENT DOCUMENTS

| | | | |
|---|---|---|---|
| JP | 2019-034524 | A | 3/2019 |
| JP | 2019-116091 | A | 7/2019 |
| JP | 2019-123137 | A | 7/2019 |

OTHER PUBLICATIONS

May 5, 2022 International Preliminary Report on Patentability in Int'l Patent Appln. No. PCT/JP2020/039745.

Ecofranking, "How to change a Neopost IS240 / IS280 Smart Franking Machine Ink Cartridge," YouTube Video, https://www.youtube.com/watch?v=MemtpevCTPQ, Upload date: Mar. 25, 2013.

* cited by examiner

RECORDING APPARATUS

This application is a continuation of application Ser. No. 17/639,358 filed Mar. 1, 2022, which was the National Stage of International Patent Appln. No. PCT/JP2020/039745 filed Oct. 22, 2020.

TECHNICAL FIELD

The present invention relates to a recording apparatus which performs recording on a recording medium by using a recording head.

BACKGROUND ART

In Patent Literature 1, there is described a printer capable of performing printing on an area of a recording medium fixed at a recording position, which is twice as large as an area of a nozzle array on a printing head. The printing is achieved by shifting a position of the printing head in a front-rear direction at an end of movement while the printing head is reciprocating in a left-right direction. In general, a recording apparatus as described in Patent Literature 1 includes a printing head (recording head), which can be mounted into or removed from the recording apparatus for replacement.

CITATION LIST

Patent Literature

PTL 1: Japanese Patent Application Laid-Open No. H10-16302

SUMMARY OF INVENTION

Technical Problem

When the recording head is mounted into or removed from the recording apparatus as described in Patent Literature 1, workability at a time of mounting and removal may be lowered depending on a position of the recording head.

The present invention has an object to provide a configuration that enables improvement of workability at a time of maintenance.

Solution to Problem

According to an aspect of the present invention, there is provided a recording apparatus configured to perform recording on a recording medium, the recording apparatus comprising: a recording head configured to discharge ink from a plurality of discharge ports to perform recording on the recording medium; a main carriage movable along a first direction; a sub-carriage held by the main carriage; and a regulating portion which regulates a movement of the recording medium along a second direction orthogonal to the first direction by the recording medium being brought into contact with the regulating portion in a case in which the recording medium is inserted into the recording apparatus, wherein the sub-carriage is moved along the first direction in association with a movement of the main carriage in a state in which the sub-carriage is held by the main carriage, and the sub-carriage is movable to a first position and to a second position different from the first position along the second direction relative to the main carriage, wherein the recording head is removably mounted to the sub-carriage, wherein the recording head performs recording on the recording medium while the main carriage is moved along the first direction in a state in which the sub-carriage is located at the first position and while the main carriage is moved along the first direction in a state in which the sub-carriage is located at the second position, wherein a shortest distance of distances between the regulating portion and the plurality of discharge ports with respect to the second direction when the sub-carriage is located at the second position is larger than a shortest distance of distances between the regulating portion and the plurality of discharge ports with respect to the second direction when the sub-carriage is located at the first position, and wherein an operation of removing the recording head from the sub-carriage is performed in the state in which the sub-carriage is located at the second position with respect to the second direction.

According to an aspect of the present invention, there is provided a recording apparatus configured to discharge ink from a plurality of discharge ports to perform recording on a recording medium, the recording apparatus comprising: an ink cartridge configured to store the ink; a main carriage movable along a first direction; a sub-carriage held by the main carriage; and a regulating portion which regulates a movement of the recording medium along a second direction orthogonal to the first direction by the recording medium being brought into contact with the regulating portion in a case in which the recording medium is inserted into the recording apparatus, wherein the sub-carriage is moved along the first direction in association with a movement of the main carriage in a state in which the sub-carriage is held by the main carriage, and the sub-carriage is movable to a first position and to a second position different from the first position along the second direction relative to the main carriage, wherein the ink cartridge is removably mounted to the sub-carriage, wherein the plurality of discharge ports are moved together with the sub-carriage, wherein the recording apparatus performs recording on the recording medium while the main carriage is moved along the first direction in a state in which the sub-carriage is located at the first position and while the main carriage is moved along the first direction in a state in which the sub-carriage is located at the second position, wherein a shortest distance of distances between the regulating portion and the plurality of discharge ports with respect to the second direction when the sub-carriage is located at the second position is larger than a shortest distance of distances between the regulating portion and the plurality of discharge ports with respect to the second direction when the sub-carriage is located at the first position, and wherein an operation of removing the ink cartridge from the sub-carriage is performed in the state in which the sub-carriage is located at the second position with respect to the second direction.

DESCRIPTION OF EMBODIMENT

Figure 1:
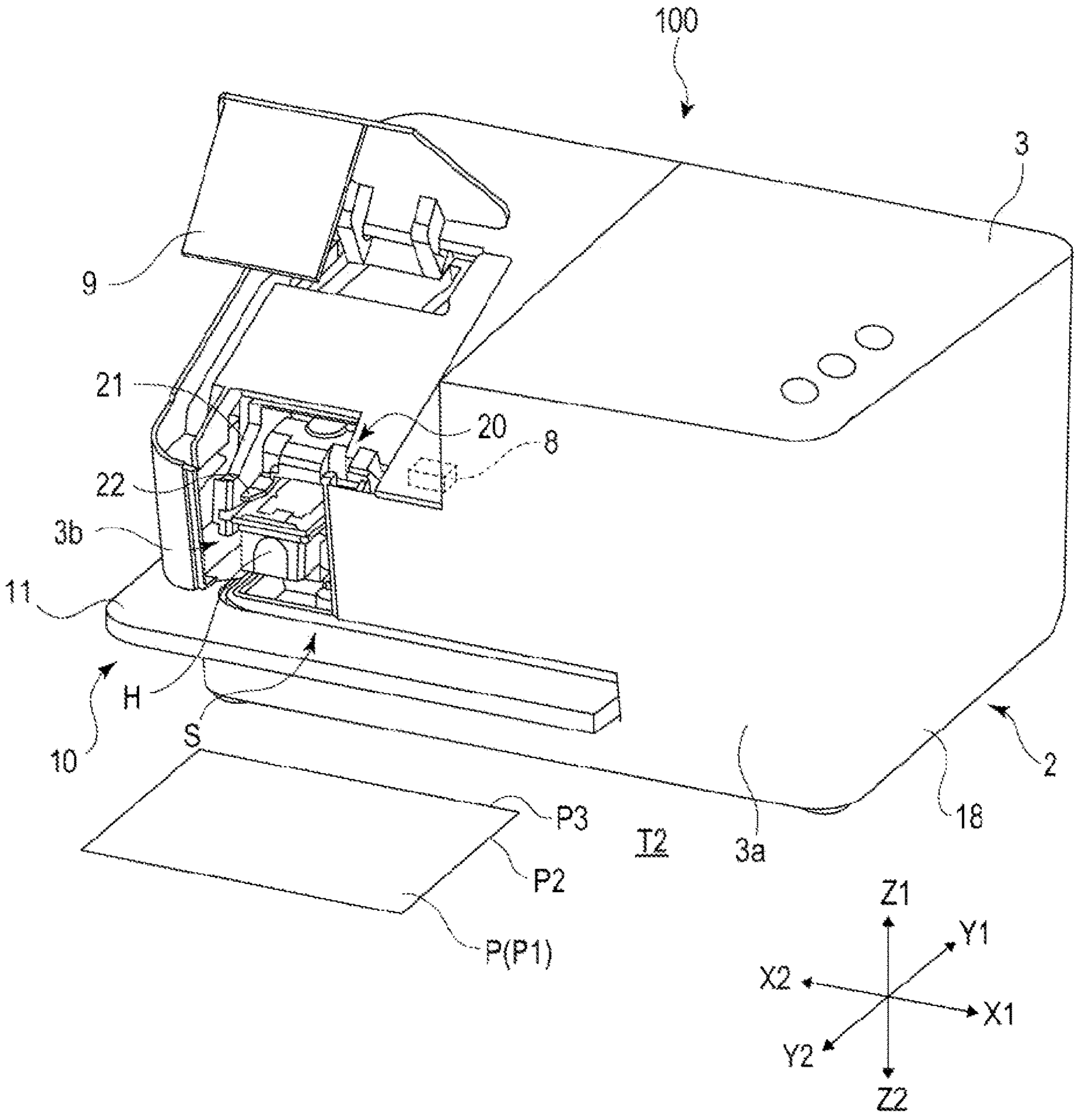
FIG. 1 is a perspective view of an inkjet recording apparatus according to an embodiment.

The embodiment is described with reference to FIG. 1 to FIG. 9. First, a schematic configuration of an inkjet recording apparatus 100 according to the embodiment is described with reference to FIG. 1 and FIG. 2.

[Inkjet Recording Apparatus]

The inkjet recording apparatus 100 according to the embodiment is a recording apparatus that operates in the following manner. A recording head H discharges ink while reciprocating (performing reciprocating scanning) in a main scanning direction (scanning direction) X1, X2 to record (form), for example, a barcode, a character, or an image on a recording surface (upper surface) P1 of a recording medium P having a substantially rectangular shape, such as a letter (envelope), a card, or a sheet.

The inkjet recording apparatus 100 includes an apparatus main body 2, a recording medium holding unit 10, a recording carriage unit 20 having a recording head H, a moving unit 30 as a main moving means, a cleaning unit 40, and a controller 50 as a control means. The apparatus main body 2 includes a base 18 and a cover member 3 as a casing removably mounted to the base 18. The recording medium holding unit 10 is supported on the base 18, and holds the recording medium P on which recording is to be performed. The moving unit 30 is supported on the base 18, and moves the recording carriage unit 20 in the main scanning direction X1, X2. The cleaning unit 40 is supported on the base 18, and cleans the recording head H. When the cover member 3 is mounted onto the base 18, there are arranged the recording medium holding unit 10, the recording carriage unit 20, the moving unit 30, the cleaning unit 40, and the controller 50 inside the cover member 3.

In the following description, a Y2 direction in FIG. 1 is also referred to as "forward", a Y1 direction in FIG. 1 as "rearward", an X2 direction in FIG. 1 as "leftward", an X1 direction in FIG. 1 as "rightward", a Z1 direction in FIG. 1 as "upward", and a Z2 direction in FIG. 1 as "downward". Further, the Y1 direction and the Y2 direction are also collectively referred to as "Y direction (front-rear direction, second direction, and sub-scanning direction)", the X1 direction and the X2 direction collectively as "X direction (right-and-left direction, first direction, and main-scanning direction)", and the Z1 direction and the Z2 direction collectively as "Z direction (up-and-down direction)". The X direction, the Y direction, and the Z direction are orthogonal to each other. An insertion port S is defined by the cover member 3 and a support plate 11 of the recording medium holding unit 10, which is described later. The insertion port S allows the recording medium P, on which recording is to be performed, to be inserted into the cover member 3 in the Y2 direction. Further, a Y2 side of the inkjet recording apparatus 100 serves as an operating side of the apparatus.

Specifically, a user performs an operation of the inkjet recording apparatus 100, for example, placement of the recording medium P or replacement of the recording head H, on the Y2 side of the inkjet recording apparatus 100.

[Recording Medium Holding Unit]

Next, the recording medium holding unit 10 is described with reference to FIG. 2 and FIG. 3. The recording medium holding unit 10 includes the support plate 11, a positioning unit R, and a recording medium detection unit 15. The positioning unit R serves as a positioning means for positioning the recording medium P, which is supported on the support plate 11 or a lifter 13 described later, in the X direction, the Y direction, and the Z direction. The support plate 11 is arranged along the X direction and the Y direction below the recording head H so as to be opposed to the recording head H. A lower surface of the recording medium P inserted through the insertion port S is brought into contact with the support plate 11, and the support plate 11 supports the recording medium P.

The positioning unit R includes a base plate 12 and the lifter 13. The base plate 12 serves as a plate member arranged between the recording head H and the support plate 11. The lifter 13 is arranged below the base plate 12. The base plate 12 has an upper regulating surface **12*f*, a right regulating surface (first surface) 12*a* as a first positioning portion (regulating portion), and a rear regulating surface (second surface) 12*b* as a second positioning portion (regulating portion). The upper regulating surface 12*f* is arranged along the X direction and the Y direction so that the recording medium P inserted through the insertion port S is sandwiched with the support plate 11 or the lifter 13**.

The right regulating surface **12*a* and the rear regulating surface 12*b* are located in a space between the base plate 12 and the support plate 11, and are formed integrally with the base plate 12. The right regulating surface 12*a* is provided so that an end P2 (see FIG. 1) of the recording medium P on the right side (X1 direction) can come into contact therewith when the recording medium P inserted through the insertion port S is moved in the rightward direction (X1 direction). The rear regulating surface 12*b* is provided so that an end P3 (see FIG. 1) of the recording medium P on the rear side (Y1-side) can come into contact therewith when the recording medium P inserted through the insertion port S is moved in the rearward direction (Y1 direction). When the recording medium P is inserted in the rightward direction (X1 direction) of the inkjet recording apparatus 100 and the recording medium P comes into contact with the right regulating surface 12*a* serving as the regulating portion that regulates the movement of the recording medium P in the X1 direction, the right regulating surface 12*a* regulates the movement of the recording medium P in the Y1 direction. Further, when the recording medium P is inserted in a direction (Y1 direction) from a front side of the inkjet recording medium 100 toward its rear side and the recording medium P comes into contact with the rear regulating surface 12*b* serving as the regulating portion that regulates the movement of the recording medium P in the Y1 direction, the rear regulating surface 12*b*** regulates the movement of the recording medium P in the Y1 direction.

The first positioning portion and the second positioning portion are not limited to surfaces that are formed so that the recording medium P can come into contact therewith, as in the embodiment. For example, the first positioning portion and the second positioning portion may be points or lines that are formed so that the end of the recording medium P in the X1 direction and the end of the recording medium P in the Y1 direction can come into contact therewith. Further, the base plate 12 is only required to have the right regulating surface 12*a* and the rear regulating surface 12*b* that are formed integrally therewith. For example, a component having the right regulating surface 12*a* and the rear regulating surface 12*b* may be formed as a component separate from the base plate 12. In this case, the component having the right regulating surface 12*a* and the rear regulating surface 12*b* is fixed to the base plate 12 by welding, with screws, or the like.

The lifter 13 is configured to be lifted up and down by a lifter lifting mechanism (not shown). When in a lift-down state, the lifter 13 is apart from the base plate 12 to allow insertion and removal of the recording medium P into and from the insertion port S. Meanwhile, in a lift-up state, the lifter 13 supports the recording medium P and presses (urges) the recording medium P upward (in the Z1 direction) so that an upper surface of the recording medium P is brought into contact with the upper regulating surface 12*f*, that is, a surface of the base plate 12 (lower surface of the base plate 12), which is opposite to the recording head H. When the lifter 13 is lifted up, the recording medium P, which has been inserted through the insertion port S and is supported on the support plate 11, is pressed against (brought into contact with) the base plate 12 at a constant pressure regardless of its thickness and is held between the lifter 13 and the base plate 12 in a sandwiched manner. As a result, the upper surface is positioned.

Further, the base plate 12 has a recording-area opening 12*c* as an opening portion passing in the up-and-down direction, a cutout portion 12*d*, and a lower guide rail 12*e* as a guiding portion. The recording-area opening 12*c* is formed so that a part of the recording medium P that has been inserted through the insertion port S and is pressed (urged) against a lower surface of the base plate 12 by the lifter 13 is exposed to the recording head H in a predetermined area of the recording medium P having a substantially rectangular shape. The recording head H can perform recording on the recording medium P exposed through the recording-area opening 12*c* within the predetermined area in which the recording-area opening 12*c* exposes the recording medium P. For example, the recording-area opening 12*c* is formed to be larger than a predetermined recording area of the recording medium P, on which the recording head H can perform recording, by about 1 mm in each of the forward, rearward, rightward, and leftward directions. Further, the recording-area opening 12*c* is located on the left side (X2 side) of the right regulating surface 12*a*, and is located on the front side (Y2 side) of the rear regulating surface 12*b*.

The lower guide rail 12*e* is formed in a V-like groove shape so as to extend in the X direction, and is formed integrally with the base plate 12. A predetermined portion of the recording carriage unit 20 can be engaged with the lower guide rail 12*e*, and the lower guide rail 12*e* guides movement of the recording carriage unit 20 in the X direction. The integral formation of the lower guide rail 12*e* with the base plate 12 enables suppression of occurrence of an error between a position of the recording carriage unit 20 and a position of the recording medium P on which the recording is to be performed. The recording carriage unit 20 slides in the X direction while being engaged with the lower guide rail 12*e*. The base plate 12 is only required to include the lower guide rail 12*e* provided integrally therewith. For example, the lower guide rail 12*e* may be formed as a component separate from the base plate 12 and fixed to the base plate 12 by welding, with screws, or the like.

Figure 8A:
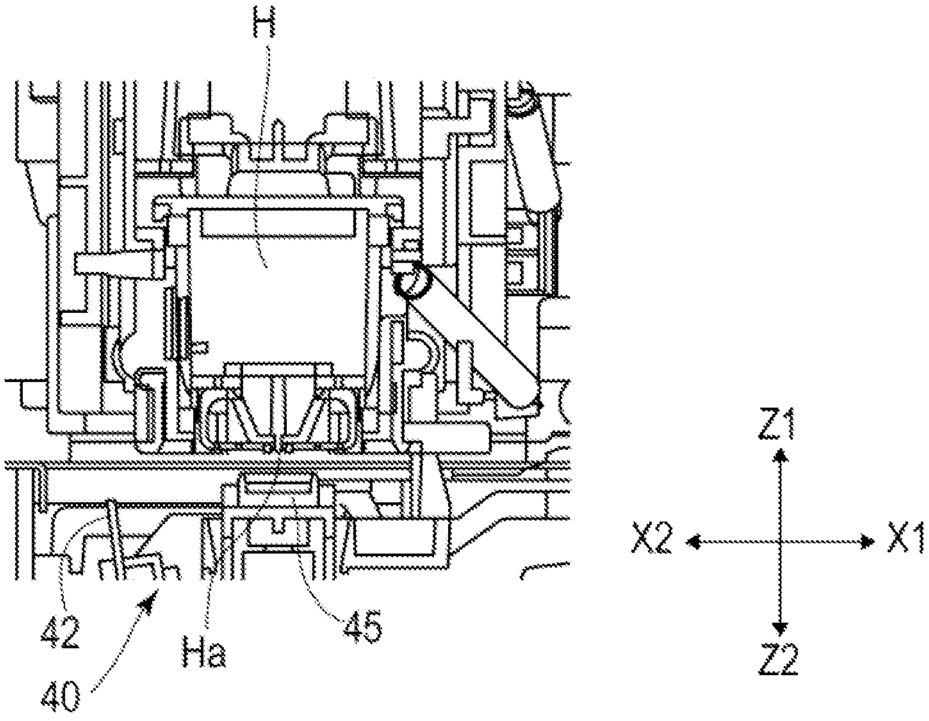
FIG. 8A is a sectional view of the cleaning unit when a cap is located at a non-covering position.
Figure 8B:
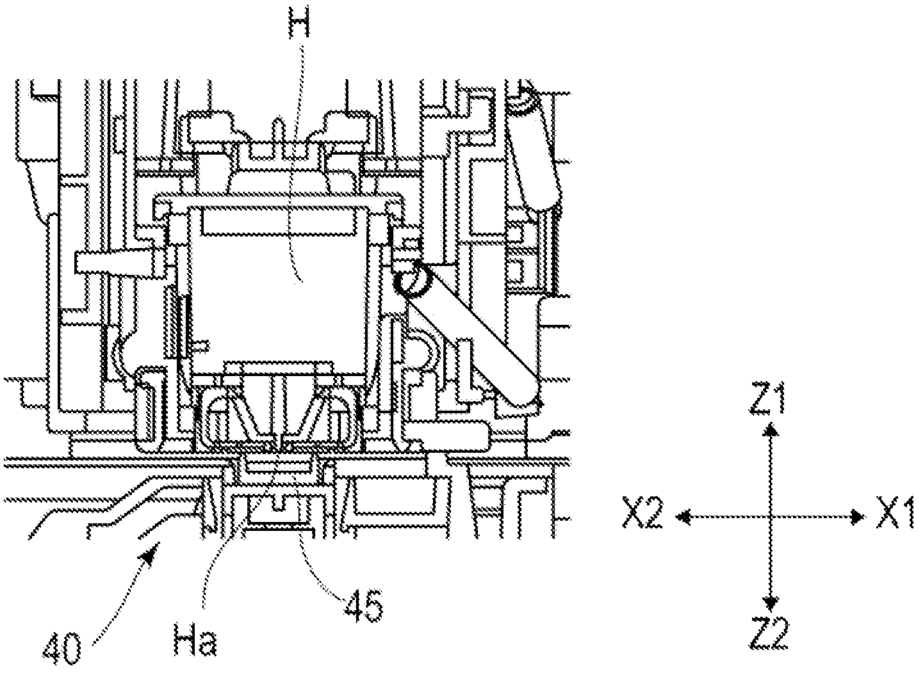
FIG. 8B is a sectional view of the cleaning unit when the cap is located at a covering position.
Figure 8C:
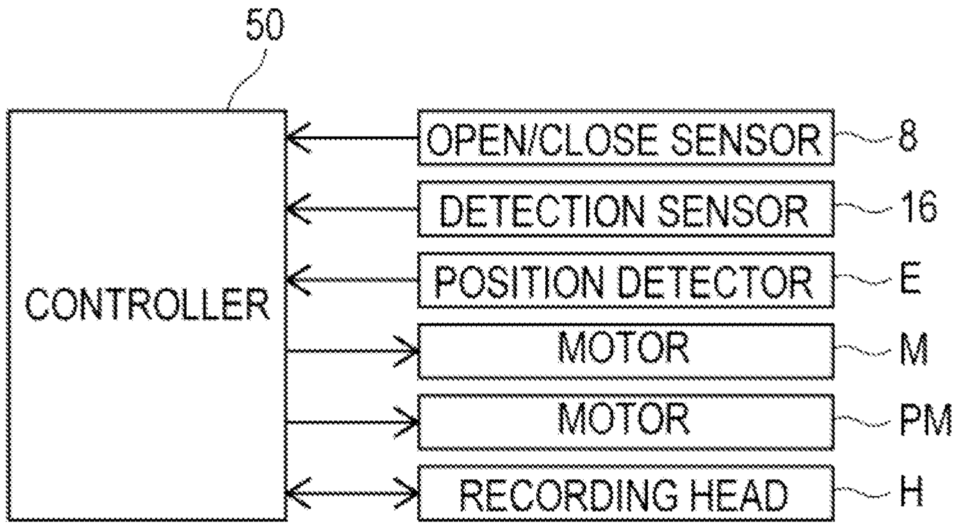
FIG. 8C is a control block diagram of the inkjet recording apparatus.

The recording medium detection unit 15 includes a detection flag (not shown), an urging member (not shown), and a detection sensor 16 (see FIG. 8C). The detection flag is supported so as to be movable with respect to the base plate 12. The detection sensor 16 outputs a signal in accordance with a position of the detection flag. For example, the detection flag is arranged in the vicinity of a corner formed by the right regulating surface 12*a* and the rear regulating surface 12*b*, and is urged by the urging member toward a position at which the detection flag can be brought into contact with the recording medium P that has been inserted. Thus, when the detection flag is pressed by the recording medium P inserted into the insertion port S, the detection flag is moved. When the detection flag is moved, the detection sensor 16 outputs a different signal to the controller 50 depending on whether the detection flag is located at a detection position or a non-detection position. When the detection flag is located at the detection position, the recording medium P is in contact with the right regulating surface 12*a* and the rear regulating surface 12*b*. When the detection flag is located at the non-detection position, the recording medium P has not been inserted into the insertion port S. In the embodiment, the detection flag is arranged in the vicinity of the corner formed by the right regulating surface 12*a* and the rear regulating surface 12*b*. However, the position of the detection flag is not limited to the above-mentioned position. The detection flag may be arranged at another position at which the recording medium P can come into contact with the detection flag.

[Moving Unit]

Figure 2:
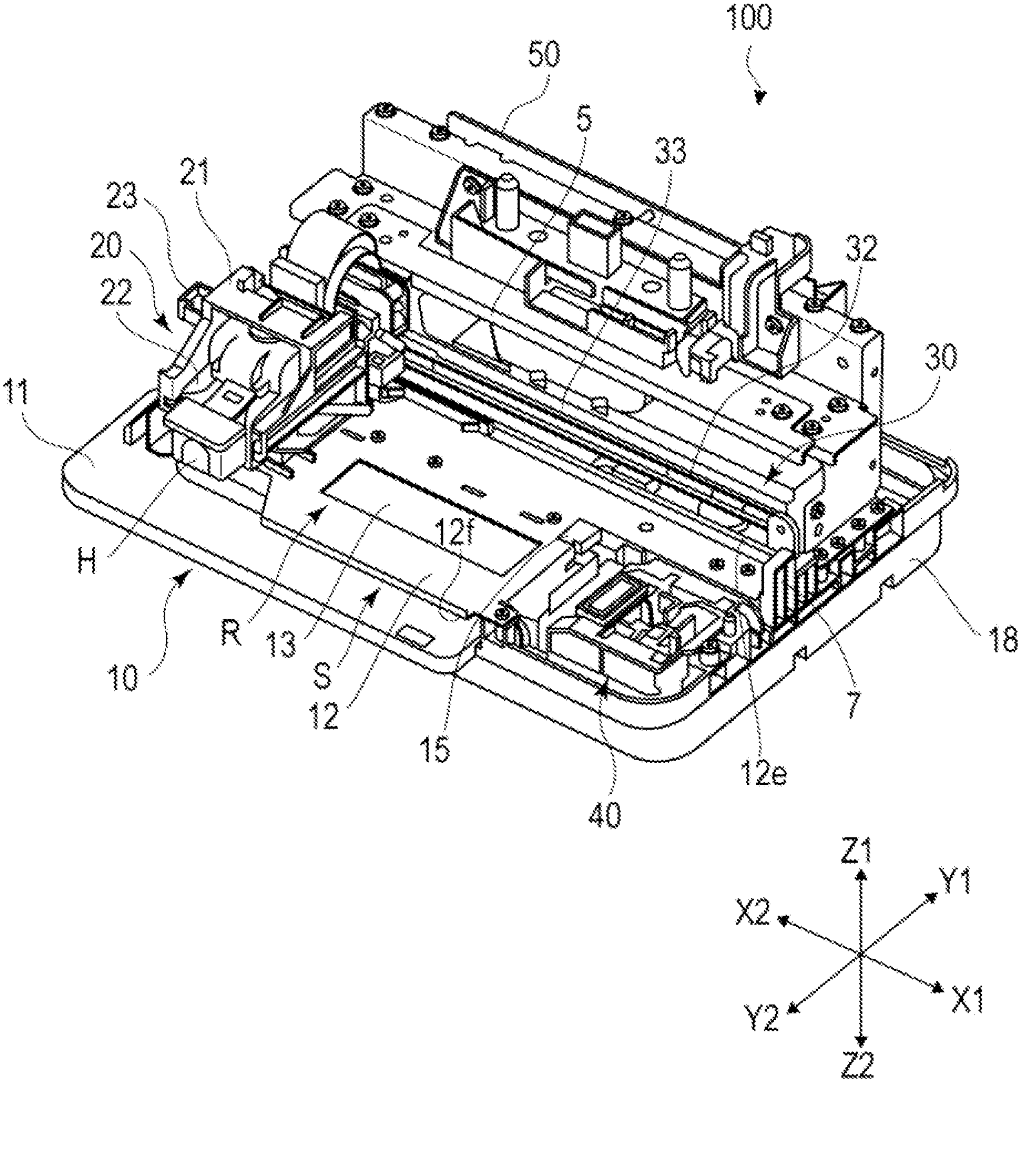
FIG. 2 is a perspective view of the inkjet recording apparatus with a cover member removed.
Figure 3:
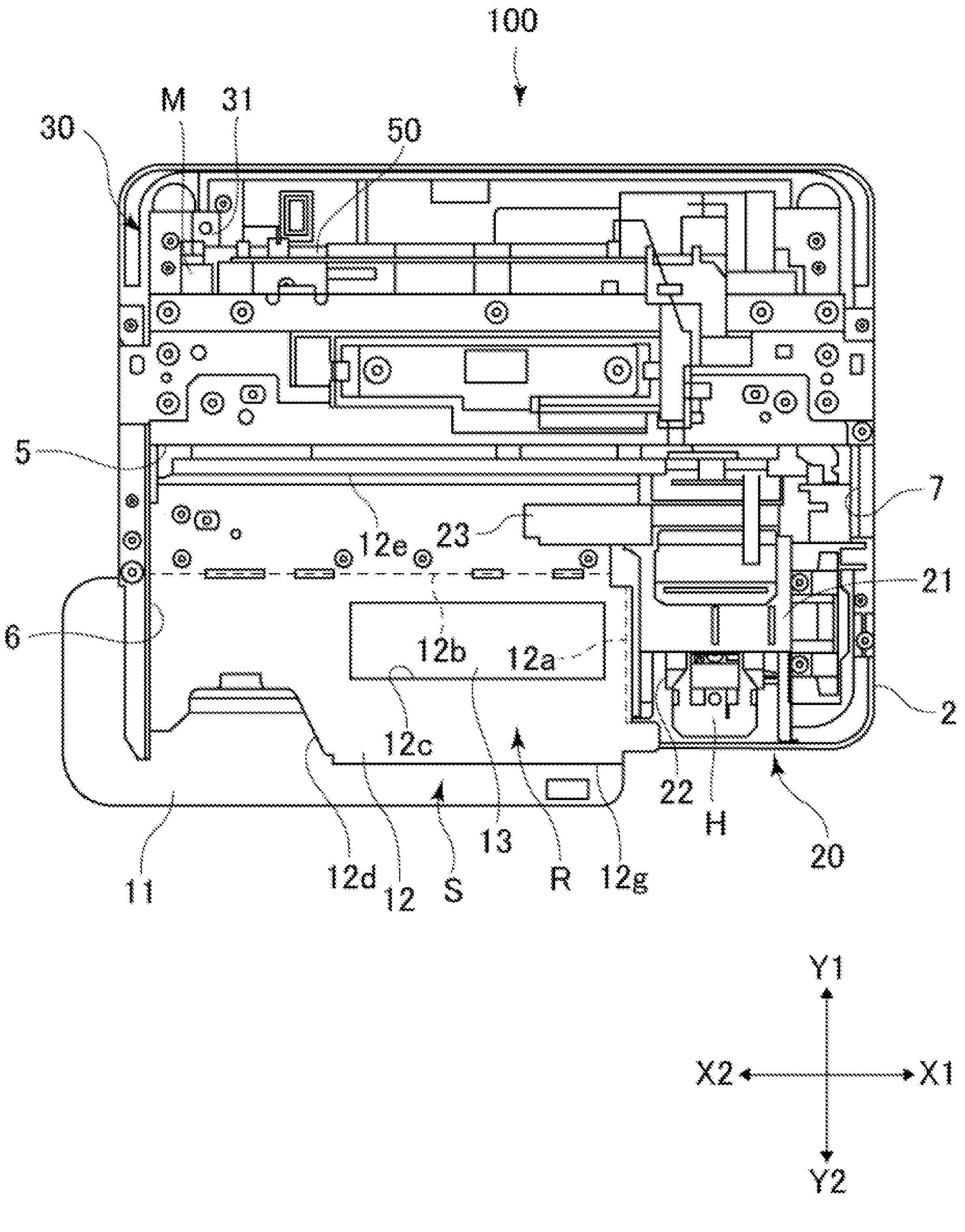
FIG. 3 is a plan view of the inkjet recording apparatus with the cover member removed.

As illustrated in FIG. 2 and FIG. 3, the moving unit 30 includes a motor M, a carriage driving mechanism 31, a timing belt 32, a linear encoder 33, and an upper guide rail 5. The carriage driving mechanism 31 includes a pulley rotated by driving the motor M, and the like. The timing belt 32 transmits an operation of the carriage driving mechanism 31 to the recording carriage unit 20. The linear encoder 33 is arranged to extend along the X direction. A position in the X direction can be detected by a position detector E (see FIG. 8C) of the recording carriage unit 20.

The upper guide rail 5 is arranged to extend along the X direction. A predetermined portion of the recording carriage unit 20 can be engaged with the upper guide rail 5, and the upper guide rail 5 guides the movement of the recording carriage unit 20 in the X direction. When the motor M is driven in a state in which the predetermined portions of the recording carriage unit 20 are engaged with the upper guide rail 5 and the lower guide rail 12*e* to regulate movement of the recording carriage unit 20 in the Y direction and the Z direction, the moving unit 30 reciprocates the recording carriage unit 20 along the X direction within a predetermined range.

[Recording Carriage Unit]

Figure 4A:
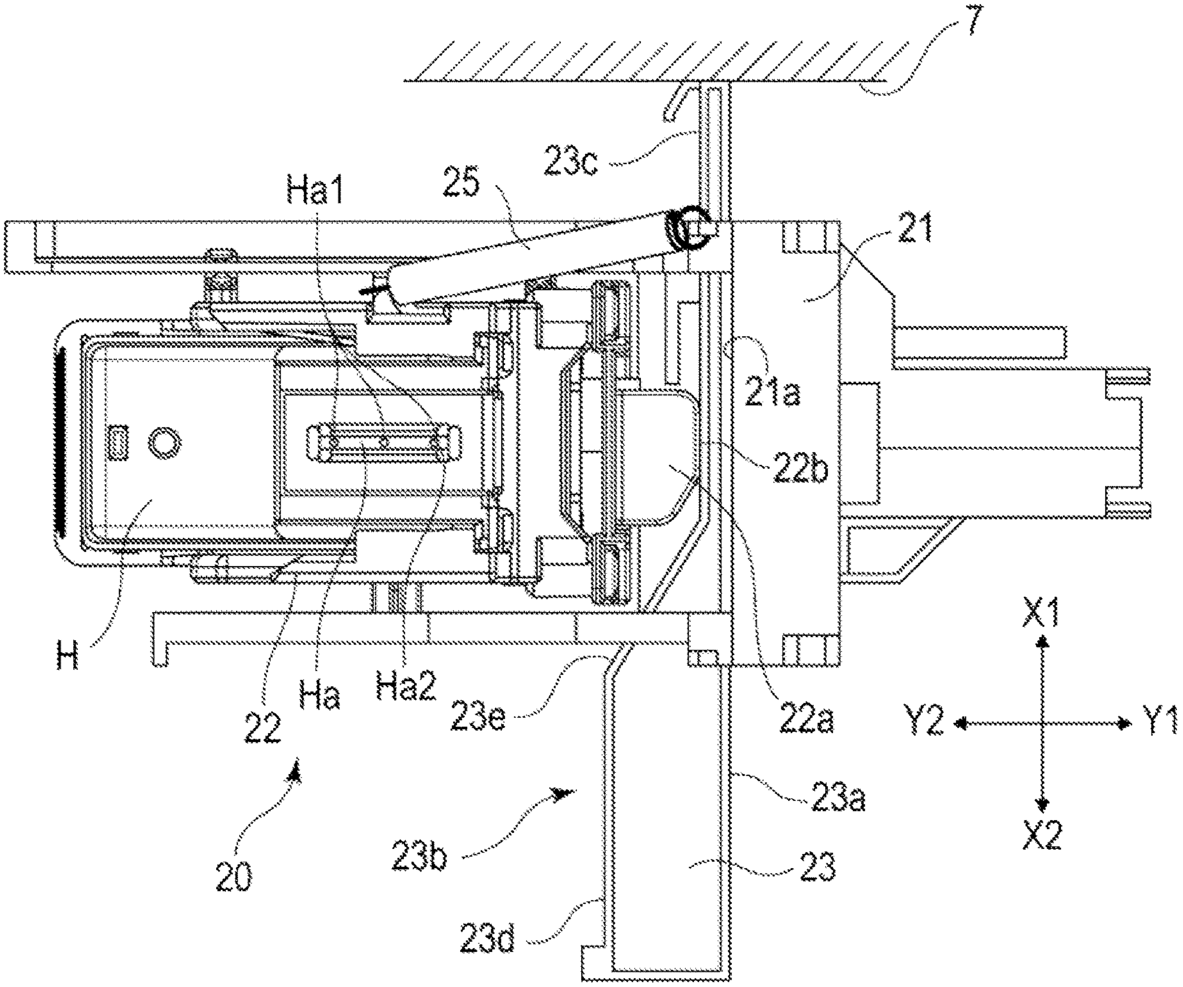
FIG. 4A is a bottom view of a recording carriage unit when the recording carriage unit is located at a right end.
Figure 4B:
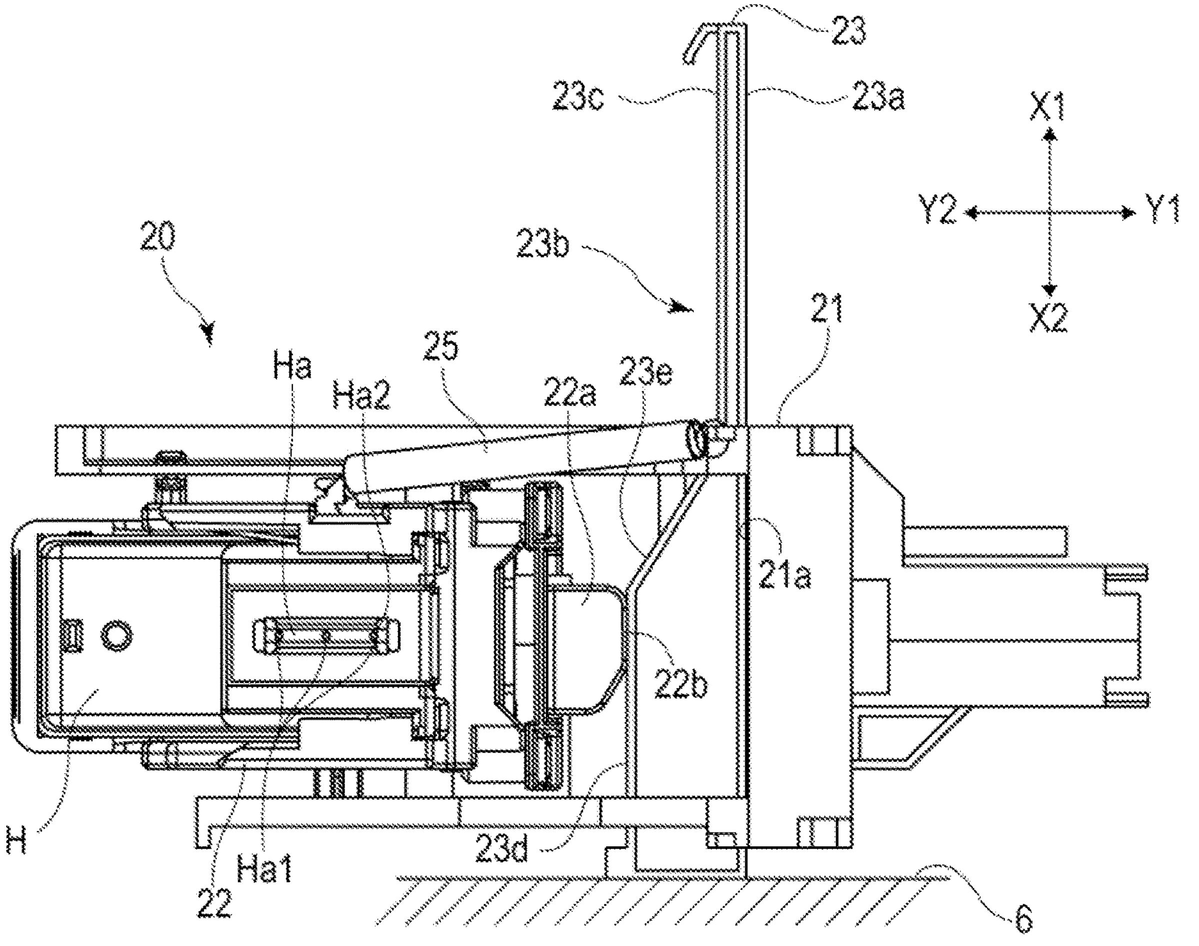
FIG. 4B is a bottom view of the recording carriage unit when the recording carriage unit is located at a left end.

Next, details of the recording carriage unit 20 are described with reference to FIG. 3, FIG. 4A, and FIG. 4B. The recording carriage unit 20 includes a main carriage 21 as a main moving unit, a sub-carriage 22 as a holding unit, the recording head H, a slide member 23 as a sub-moving means, and a carriage spring 25 (FIG. 4A and FIG. 4B).

The main carriage 21 performs reciprocating scanning in the X direction. More specifically, when the predetermined portions of the main carriage 21 are engaged with the upper guide rail 5 and the lower guide rail 12*e*, movement of the main carriage 21 in the Y direction and Z direction is regulated. Further, when the main carriage 21 is driven by the motor M, the main carriage 21 can reciprocate (perform reciprocating scanning) in the X direction along the upper guide rail 5 and the lower guide rail 12*e* together with the sub-carriage 22 and the recording head H (see FIG. 2). Further, the main carriage 21 holds the sub-carriage 22 movably in the Y direction with respect to the main carriage 21, and holds the slide member 23 movably in the X direction with respect to the main carriage 21.

The sub-carriage 22 removably holds the recording head H. For example, the sub-carriage 22 includes side walls (not shown), a rear regulating portion (not shown), a recording head support portion (not shown), and an engaging portion (not shown), which regulate movement of the recording head H with respect to the sub-carriage 22. The side walls are a pair of side walls arranged so as to be apart from each other in the X direction by a distance corresponding to a width of the recording head H in the X direction, and regulate movement of the recording head H in the X direction with respect to the sub-carriage 22. When the recording head H is mounted from the front side (Y2 side), the rear regulating portion can come into contact with a predetermined portion of the recording head H in the Y direction. The contact of the rear regulating portion with the recording head H regulates rearward (Y1-direction) movement of the recording head H with respect to the sub-carriage 22.

Further, for example, the recording head support portion can be brought into contact with a lower side (Z2 side) of a protruding portion (not shown), which is arranged on a rear end side (Y1 side) of the recording head H and formed to protrude in the X direction from a side surface of the recording head H in the X direction, and supports the recording head H from below. The contact of the recording head support portion with the protruding portion regulates downward (Z2-direction) movement of the recording head H with respect to the sub-carriage 22 on the rear end side (Y1 side), and supports the recording head H so that a front end side (Y2 side) of the recording head H can rock in the Z direction. The engaging portion is engageable with an engaged portion (not shown) of the recording head H in a state in which the recording head H is mounted in the sub-carriage 22. The engagement of the engaging portion with the engaged portion regulates rocking of the front end side (Y2 side) of the recording head H in the Z direction.

When, for example, a user mounts the recording head H into the sub-carriage 22, the user first moves the recording head H rearward (in the Y1 direction) in a state in which the front end side (Y2 side) of the recording head H is inclined slightly downward (in the Z2 direction) with respect to the sub-carriage 22, to thereby insert the recording head H into a space between the pair of side walls and bring the recording head H into contact with the rear regulating portion. Next, the user moves the front end side (Y2 side) of the recording head H upward (in the Z1 direction) in a state in which the recording head H is in contact with the rear regulating portion and the protruding portion of the recording head H is brought into contact with the recording head support portion to cause the recording head support portion to support the rear end side of the recording head H, and engages the engaged portion with the engaging portion. In this manner, the recording head H is mounted to the sub-carriage 22, and is regulated in movement in the X direction, the Y direction, and the Z direction with respect to the sub-carriage 22. Further, when, for example, the user removes the recording head H from the sub-carriage 22, the user performs a process reverse to the process of mounting described above. Specifically, the user moves the front end side (Y2 side) of the recording head H downward (in the Z2 direction, and in a direction of approaching the base plate 12) to disengage the engaged portion from the engaging portion, and then moves the recording head H forward (in the Y2 direction), to thereby remove the recording head H.

The sub-carriage 22 includes a board (not shown), which electrically connects a contact point of the recording head H and the controller 50 to each other in a state in which the sub-carriage 22 holds the recording head H (the recording head H is mounted into the sub-carriage 22). The recording head H outputs signals to the controller 50 via the board of the sub-carriage 22. The signals include a signal output in accordance with whether the recording head H is mounted, a signal output in accordance with a remaining amount of ink, and a signal output from the linear encoder 33 in accordance with a position of the recording head H. The controller 50 outputs a control signal for controlling the recording head H to the recording head H via the board of the sub-carriage 22. Further, the sub-carriage 22 has a contact portion 22*a*. The contact portion 22*a* is formed at a rear end of the sub-carriage 22 in a rearwardly protruding (protruding in the Y1 direction) manner, and is slidable while being held in contact with the slide member 23.

The recording head H includes a discharge portion Ha having a plurality of discharge ports (nozzles, not shown) arranged at a lower portion of the recording head H and configured to discharge ink, an ink cartridge (not shown) configured to store ink, and the like. The recording head H including the above-mentioned components is formed as a unit mountable to and removable from the sub-carriage 22. The recording head H can form (record) an image having a predetermined length in the Y direction on the recording medium P by discharging ink from the discharge portion Ha. In the embodiment, the recording head H can form an image having a length of 0.5 inch in the Y direction.

The ink cartridge and the recording head H may be formed integrally or may be formed as separate members. When the ink cartridge and the recording head H are separate members, the ink cartridge alone may be removed for replacement.

The slide member 23 is held between a rear contact surface 22*b* and an opposed surface 21*a* of the main carriage 21 so as to be movable in the X direction with respect to the main carriage 21. The rear contact surface 22*b* is a rear surface of the contact portion 22*a* of the sub-carriage 22. The opposed surface 21*a* is opposed to the rear contact surface 22*b* in the Y direction. In the embodiment, the slide member 23 is inserted into a gap between the rear contact surface 22*b* of the sub-carriage 22 and the opposed surface 21*a* of the main carriage 21 through a through hole (not shown) formed in the main carriage 21. Further, the slide member 23 is formed to be longer than the main carriage 21 in the X direction. Thus, any one of or both of a right end (X1-side end) and a left end (X2-side end) of the slide member 23 protrude beyond the main carriage 21 in the X direction depending on a position of the slide member 23 in the X direction with respect to the main carriage 21.

The slide member 23 has at least two portions with different thicknesses in the Y direction, which are formed at different positions in the X direction. In the embodiment, the slide member 23 is formed so that surfaces of the portions having different thicknesses are connected to each other with an inclined surface 23*e*. More specifically, the slide member 23 is formed so that its rear surface 23*a* (one surface) in the Y direction, which is opposed to the opposed surface 21*a* of the main carriage 21, becomes parallel to the X direction over its entire length in the X direction. Further, the slide member 23 has a front surface 23*b* (another surface) in the Y direction, which is opposed to the rear contact surface 22*b* of the sub-carriage 22. The slide member 23 is formed so that a left regulating surface 23*d* of the front surface 23*b*, which is located on the X2 side, protrudes farther in the Y2 direction than a right regulating surface 23*c* of the front surface 23*b*, which is located on the X1 side. The right regulating surface 23*c* and the left regulating surface 23*d* are formed so as to be parallel to the rear surface 23*a*, and are smoothly connected to each other with the inclined surface 23*e*. In the embodiment, the slide member 23 has a larger thickness in the Y direction on the X2 side than a thickness on the X1 side.

The carriage spring 25 is connected between a part of the main carriage 21 and a part of the sub-carriage 22, and urges the sub-carriage 22 rearward in the Y direction (in the Y1 direction) with respect to the main carriage 21. The carriage spring 25 urges the sub-carriage 22 rearward (in the Y1 direction) with respect to the main carriage 21 so that the slide member 23 is sandwiched between the main carriage 21 and the sub-carriage 22. The carriage spring 25 brings the rear surface 23*a* of the slide member 23 into contact with the opposed surface 21*a* of the main carriage 21, and brings the rear contact surface 22*b* of the sub-carriage 22 into contact with the front surface 23*b* of the slide member 23.

A position of the recording head H (sub-carriage 22) in the Y direction with respect to the main carriage 21 is determined by a position of the slide member 23 in the X direction with respect to the main carriage 21. More specifically, when the portion of the slide member 23, which has a larger thickness in the Y direction, is located between the opposed surface 21*a* of the main carriage 21 and the rear contact surface 22*b* of the sub-carriage 22, the recording head H is located at a rear position (first position) on the Y1 side with respect to the main carriage 21. Meanwhile, when the portion of the slide member 23, which has a smaller thickness in the Y direction, is located between the opposed surface 21*a* and the rear contact surface 22*b*, the recording head H is located at a front position (second position) on the Y2 side of the rear position with respect to the main carriage 21. As described above, when the slide member 23 moves in the X direction relative to the main carriage 21, the recording head H moves together with the sub-carriage 22 in the Y direction with respect to the main carriage 21.

[Relationship Between Position of Recording Head in X Direction and Position of Recording Head in Y Direction]

Next, a relationship between a position of the recording head H in the X direction and a position the recording head H in the Y direction is described with reference to FIG. 4A, FIG. 4B, FIG. 5A, and FIG. 5B. In the embodiment, the movement of the recording carriage unit 20 in the X direction brings an end of the slide member 23 in the X direction into contact with a part of the base 18 to thereby move the slide member 23 in the X direction with respect to the main carriage 21.

More specifically, as illustrated in FIG. 4A, when the main carriage 21 is located at a right end (X1-side end) of a movement region within which the main carriage 21 can move in the X direction, the right end (X1-side end) of the slide member 23 is in contact with a right contact plate 7 provided onto the base 18. In this state, the portion of the slide member 23 with a smaller thickness in the Y direction is located between the opposed surface 21*a* of the main carriage 21 and the rear contact surface 22*b* of the sub-carriage 22, and the sub-carriage 22 is located at the rear position in the Y direction. When the main carriage 21 moves leftward (in the X2 direction) in this state, as illustrated in FIG. 5B, the recording head H moves (performs main scanning) in the X direction toward a left end (end in the X2 direction) of the movement region while being maintained in the sub-carriage 22 located at the rear position.

Further, as illustrated in FIG. 4B, when the recording head H is located at the left end (X2-side end) of the movement region, the left end (X2-side end) of the slide member 23 is in contact with a left contact plate 6 provided onto the base 18. In this state, the portion of the slide member 23 with a larger thickness in the Y direction is located between the opposed surface 21*a* of the main carriage 21 and the rear contact surface 22*b* of the sub-carriage 22, and the sub-carriage 22 is located at the front position in the Y direction. When the recording carriage unit 20 moves rightward (in the X1 direction) in this state, as illustrated in FIG. 5A, the recording head H moves in the X1 direction toward the right end (X1-side end) of the movement region while being maintained in the sub-carriage 22 located at the front position.

A positional relationship between the inkjet recording apparatus 100 and the recording head H is described for a state of FIG. 4A, that is, a state in which the sub-carriage 22 is located at the rear position and a state of FIG. 4B, that is, a state in which the sub-carriage 22 is located at the front position. Among a plurality of discharge ports Ha1 of the discharge portion Ha, a discharge port Ha2, which is located at an end in the Y1 direction, has the shortest distance in the Y direction from the rear regulating surface 12*b* in FIG. 3. In comparison of the distance between the discharge port Ha2 and the rear regulating surface 12*b* in the Y direction, the distance given when the sub-carriage 22 is located at the front position is longer than the distance given when the sub-carriage 22 is located at the rear position.

Figure 5A:
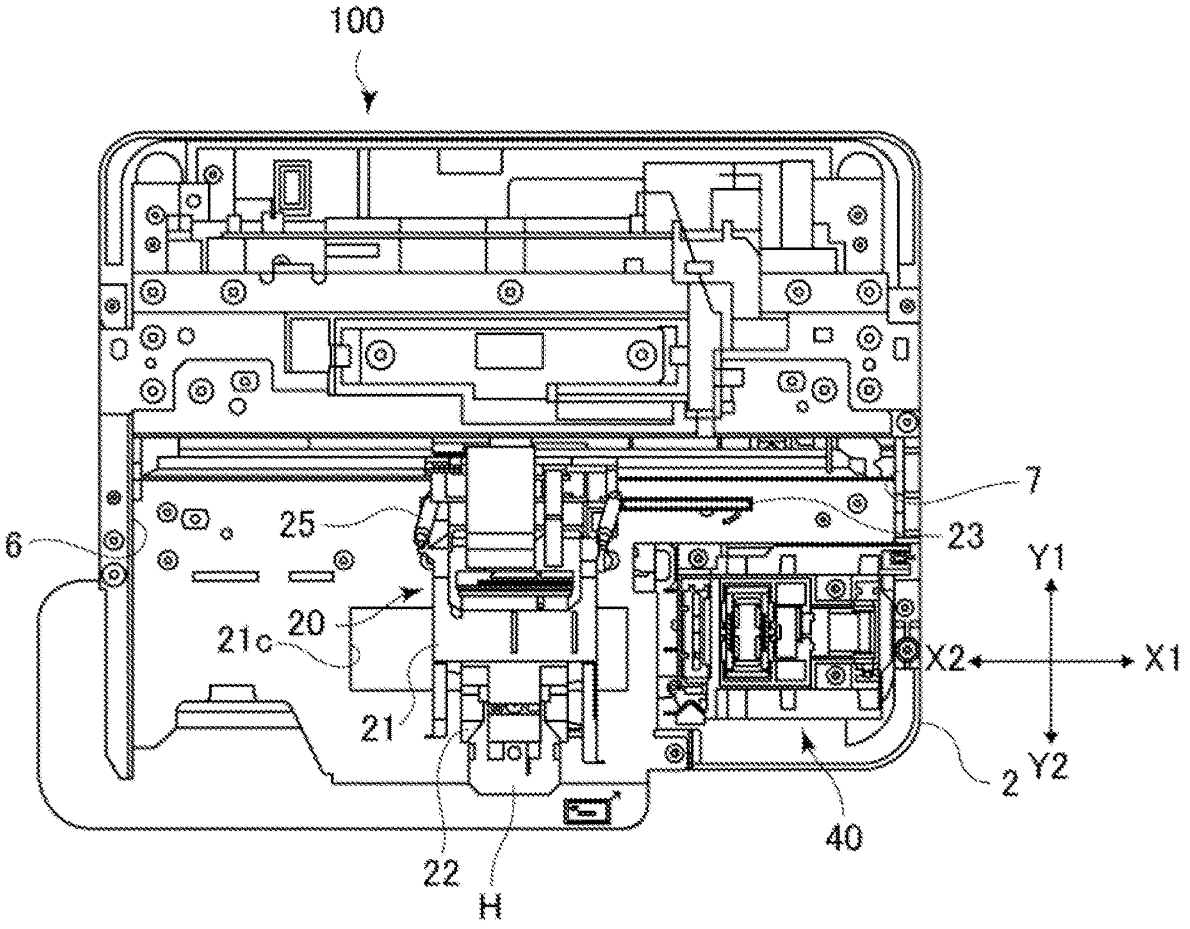
FIG. 5A is a plan view of the inkjet recording apparatus when a recording head is located at a front position.
Figure 5B:
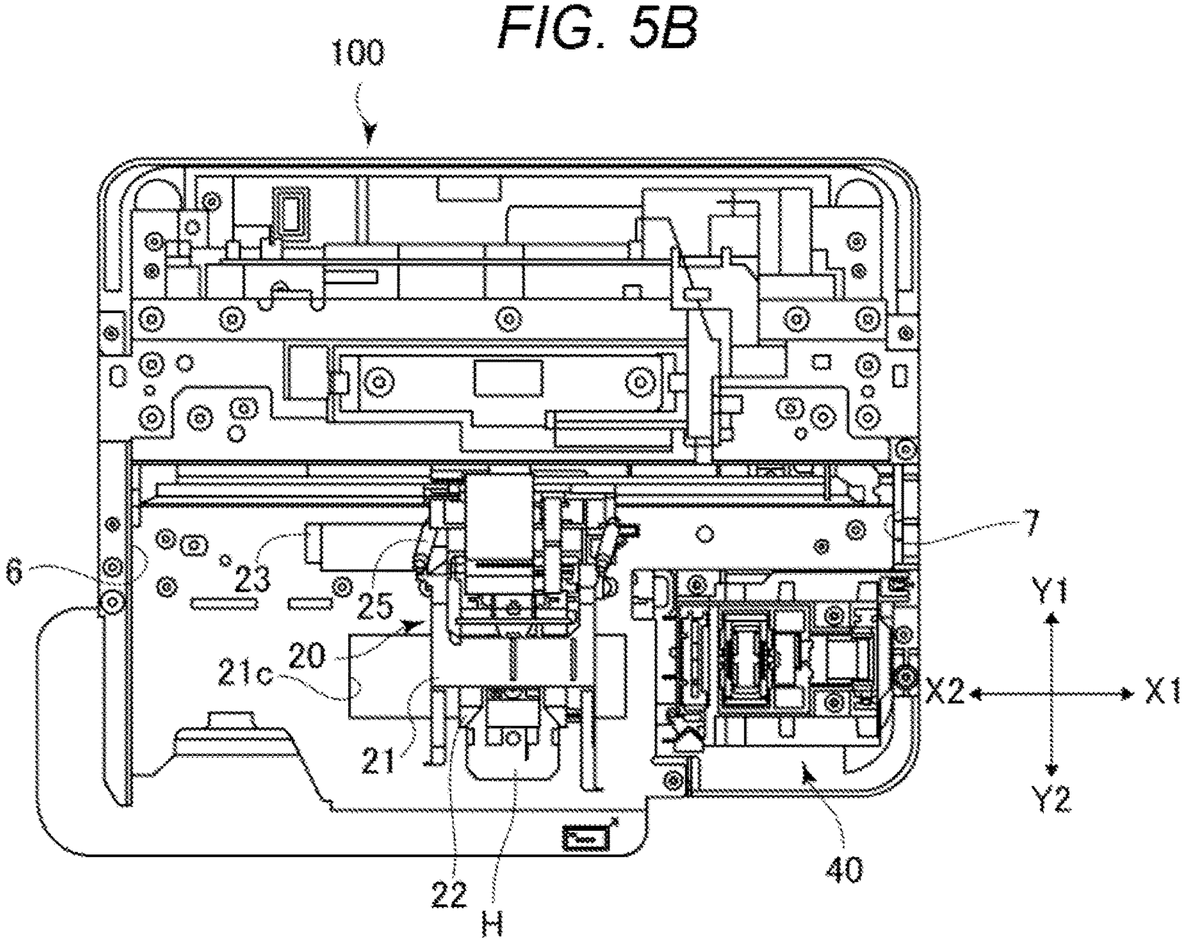
FIG. 5B is a plan view of the inkjet recording apparatus when the recording head is located at a rear position.

Further, when the recording head H is in a state of FIG. 5A, that is, when the recording head H reaches a predetermined position on the right side (X1 side) of the recording-area opening 12*c* by the recording carriage unit 20 being moved rightward (in the X1 direction) in a state in which the recording head H is held by the sub-carriage 22 located at the front position, the right end (X1-side end) of the slide member 23 comes into contact with the right contact plate 7. When the recording carriage unit 20 further moves rightward (in the X1 direction), the slide member 23 is pressed against the right contact plate 7 to move leftward (in the X2 direction) with respect to the main carriage 21 to thereby start moving the sub-carriage 22 toward the rear position. When the recording carriage unit 20 further moves rightward (in the X1 direction), the slide member 23 terminates the movement of the sub-carriage 22 toward the rear position before a position of the discharge portion Ha of the recording head H held by the sub-carriage 22 in the X direction reaches a position at which the discharge portion Ha is brought into contact with a cleaning blade 42 described later.

Further, when the sub-carriage 22 is in a state of FIG. 5B, that is, when the recording head H held by the sub-carriage 22 reaches a predetermined position on the left side (X2 side) of the recording-area opening 12*c* by the recording carriage unit 20 being moved leftward (in the X2 direction) in a state in which the sub-carriage 22 is located at the rear position, the left end (X2-side end) of the slide member 23 comes into contact with the left contact plate 6. When the recording carriage unit 20 further moves leftward (in the X2 direction), the slide member 23 is pressed against the left contact plate 6 to move rightward (in the X1 direction) with respect to the main carriage 21 to thereby start moving the sub-carriage 22 forward (in the Y2 direction). When the recording carriage unit 20 further moves leftward (in the X2 direction), the slide member 23 terminates the forward movement (in the Y2 direction) of the sub-carriage 22 before the recording head H reaches the left end (X2-side end) of the movement region in the X direction, that is, a replacement position described later.

As described above, while reciprocating in the X direction, the sub-carriage 22 is moved forward (in the Y2 direction) or rearward (in the Y1 direction) by the slide member 23. Specifically, the slide member 23 moves the sub-carriage 22 forward (in the Y2 direction) to the front position in conjunction with an action for moving the sub-carriage 22 to the left (X2-side) end of a movement range (predetermined range), which is caused by the moving unit 30, and moves the sub-carriage 22 rearward (in the Y1 direction) to the rear position in conjunction with an action for moving the sub-carriage 22 to the right (X1-side) end of the movement range, which is caused by the moving unit 30.

In the embodiment, the slide member 23 moves the sub-carriage 22 forward (in the Y2 direction) in conjunction with an action for moving the recording carriage unit 20 to the left (X2-side) end of the movement range, and moves the sub-carriage 22 in the Y1 direction in conjunction with an action for moving the recording carriage unit 20 to the right (X1-side) end of the movement range. However, the movement of the slide member 23 is not limited to the above-mentioned movement. The sub-moving means may move the holding portion to the second position (front position) when the holding portion is located at the X1-side end of the movement range in the main-scanning direction and move the holding portion to a first position (rear position) located on a Y1 side of the second position (front position) when the holding portion is located at the X2-side end of the predetermined range described above in the main-scanning direction.

For example, the sub-moving means may change a position of the holding portion from the first position (rear position) to the second position (front position) after the holding portion reaches the X1-side end of the movement range and change the position of the holding portion from the second position (front position) to the first position (rear position) after the holding portion reaches the X2-side end of the movement range. Further, for example, the sub-moving means may be a slide member that is configured to start rearward movement (movement in the Y1 direction) of the holding portion that is moving rightward (in the X1 direction) when the holding portion reaches a position on the right side (X1 side) of a predetermined recording area in which recording on the recording medium P can be performed and start forward movement (movement in the Y2 direction) of the holding portion that is moving leftward (in the X2 direction) when the holding portion reaches a position on the left side (X2 side) of the predetermined recording area.

[Recording Through Reciprocation of Recording Head]

Figure 6A:
FIG. 6A is a view for illustrating a state in which only recording in a forward way has been performed on a recording medium.
Figure 6B:
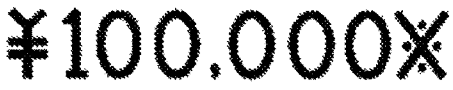
FIG. 6B is a view for illustrating a state after recording on the recording medium is completed.

As illustrated in FIG. 5B, the recording head H discharges ink onto the recording medium P through the recording-area opening 12*c* while the sub-carriage 22 located at the rear position is moving (performing main-scanning) rightward (in the X2 direction), and performs recording in a forward way on the recording medium P to achieve a rear half part of recording, as illustrated in FIG. 6A. After that, the recording head H starts moving together with the sub-carriage 22 at a position outside the predetermined recording area toward the front position. As illustrated in FIG. 5A, the recording head H discharges the ink onto the recording medium P through the recording-area opening 12*c* while moving rightward (in the X1 direction), and performs recording in a backward way on the recording medium P to achieve a front half part of the recording, as illustrated in FIG. 6B. In this manner, the recording head H records, for example, an image having a width twice as large as a width in the Y direction over which the recording head H can perform recording on a predetermined recording area of the recording medium P. In the embodiment, the recording head H records part of an image, which has a width of 0.5 inch (1.27 cm) through each of recording in the forward way and recording in the backward way, and thus achieves the recording of the image having a total width of 1 inch (2.54 cm) on the recording medium P.

[Cleaning Unit]

Figure 7A:
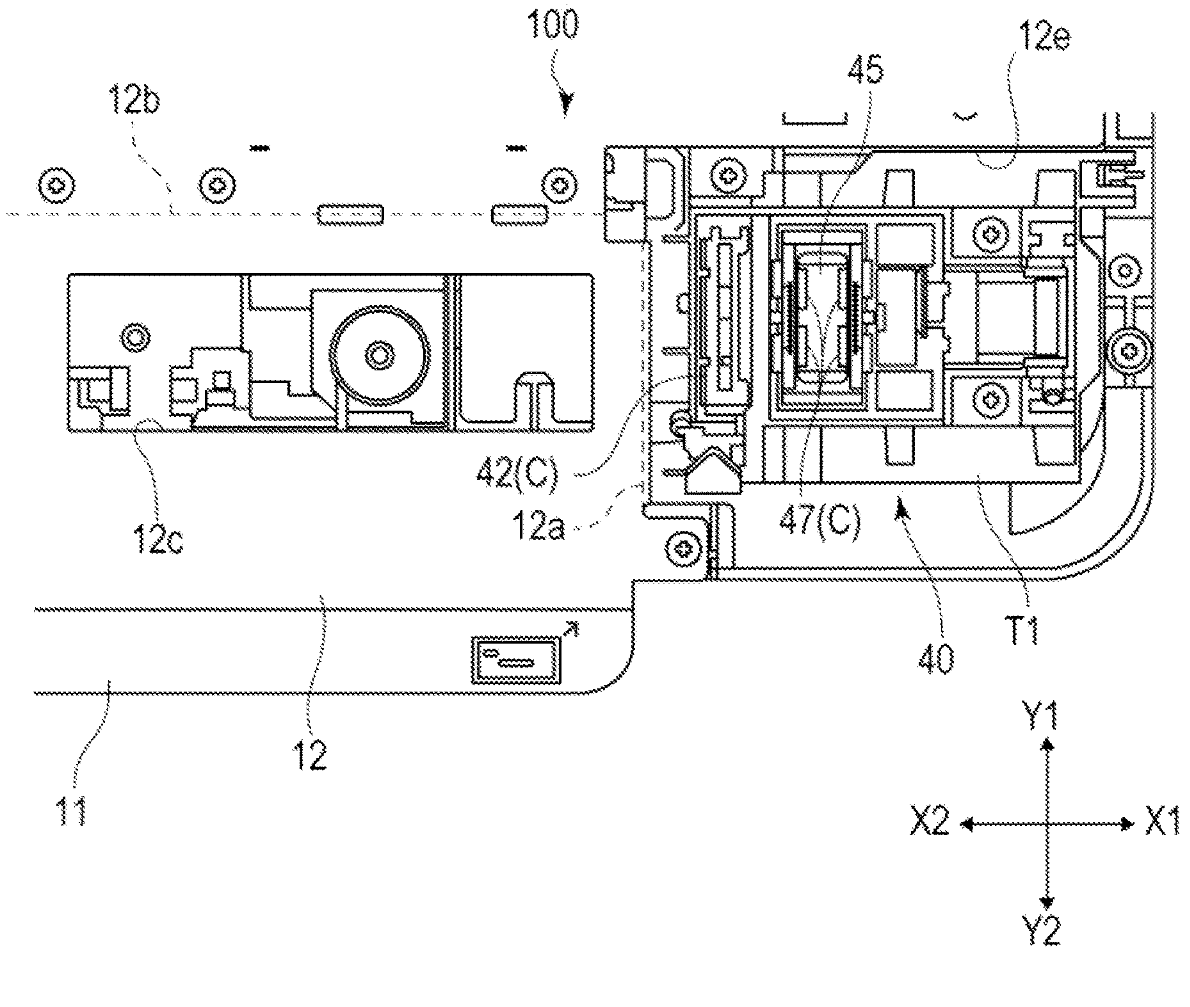
FIG. 7A is a plan view of a cleaning unit and a region therearound.
Figure 7B:
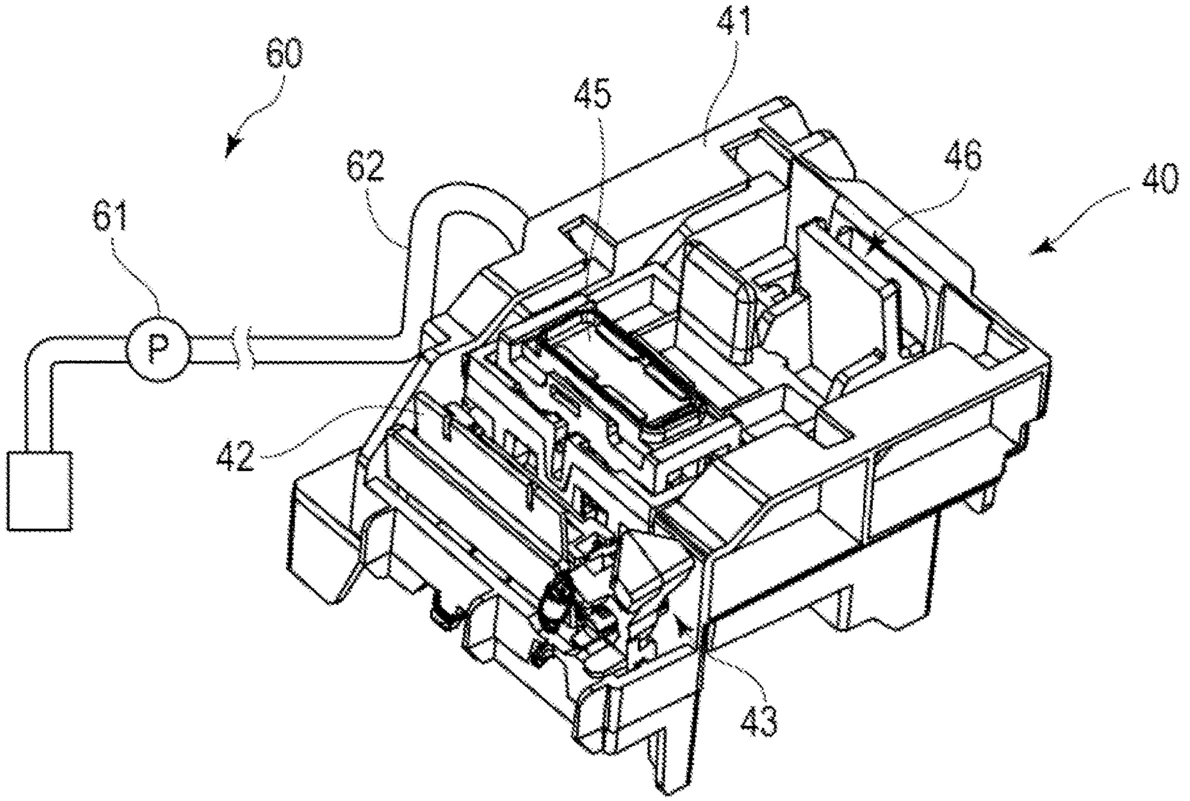
FIG. 7B is a perspective view of the cleaning unit.

Next, the cleaning unit 40 that cleans the recording head H is described with reference to FIG. 7A, FIG. 7B, FIG. 8A, FIG. 8B, and FIG. 8C. As illustrated in FIG. 7A and FIG. 7B, the cleaning unit 40 includes a base member 41, a cleaning blade 42 as a cleaning member, a blade lifting mechanism 43, a cap 45 as a covering member configured to cover the discharge portion Ha, a cap lifting mechanism 46, and a suction unit 60 as a suction means. The base member 41 supports the cleaning blade 42 and the cap 45 so that the cleaning blade 42 and the cap 45 can be lifted up and down.

The blade lifting mechanism 43 serving as a cleaning-member moving means moves (lifts up and down) the cleaning blade 42 from a contact position at which the cleaning blade 42 can be brought into contact with the discharge portion Ha and a retreated position at which the cleaning blade 42 is retreated from the contact position along with the movement of the recording head H in the X direction. For example, the blade lifting mechanism 43 holds the cleaning blade 42 in the contact position when the recording head H approaches the cleaning blade 42 from the left side (X2 side), and moves the cleaning blade 42 and holds the cleaning blade 42 in the retreated position when the recording head H approaches the cleaning blade 42 from the right side (X1 side).

The cleaning blade 42 is located on the rear side (Y1 side) of a front (Y2-side) end of the discharge portion Ha (end of a region having the plurality of discharge ports Ha1, see FIG. 4B) when the recording head H is located at the front position, in a space T1 defined on a right side (X1 side) of the right regulating surface 12*a* and on a front side (Y2 side) of the rear regulating surface 12*b*.

While being located at the contact position, the cleaning blade 42 is brought into contact with (slides against) the discharge portion Ha of the recording head H being moved in the X direction by the moving unit 30. In this manner, the cleaning blade 42 wipes out ink adhering to the discharge portion Ha to clean the discharge portion Ha after the recording. The cleaning blade 42 is located at the position on the right side (X1 side) of the right regulating surface 12*a*, which does not correspond to a position at which the recording medium P is positioned by the positioning unit R. Thus, adhesion of the ink scattered at the time of wipeout to the recording medium P can be suppressed.

Further, in many cases, the recording head H approaches the cleaning blade 42 from the left side (X2 side) after the recording on the recording medium P is completed. Thus, it is highly important to clean the discharge portion Ha with the cleaning blade 42. In a case in which the recording head H approaches the cleaning blade 42 from the right side (X1 side), the recording on the recording medium P has not been performed after previous cleaning of the discharge portion Ha. Thus, it is less important to clean the discharge portion Ha with the cleaning blade 42.

As described above, in a case in which the recording head H moves the cleaning blade 42 from the right side (X1 side) to the left side (X2 side) and it is highly important to clean the discharge portion Ha, the blade lifting mechanism 43 holds the cleaning blade 42 in the contact position. As a result, a frequency of contact of the cleaning blade 42 with the discharge portion Ha is decreased to suppress degradation of contact portions of the cleaning blade 42 and the discharge portion Ha.

The cap lifting mechanism 46 serving as a covering-member moving means moves (lifts up and down) the cap 45 between a covering position in which the cap 45 can cover the discharge portion Ha as illustrated in FIG. 8B and a non-covering position in which the cap 45 is retreated downward from the covering position so as to allow movement of the recording head H as illustrated in FIG. 8A. The cap 45 is provided on the front side (Y2 side) of the rear regulating surface 12*b* and on the right side (X1 side) of the cleaning blade 42. Further, the cap 45 is formed to be larger than the discharge portion Ha in the X direction and the Y direction in a state in which the recording head H is located at the rear position and at a right (X1-side) end (home position described later) of the movement range, and thus can cover the discharge portion Ha when the recording head H is located at the home position. The cap 45 is connected to the suction unit 60 capable of sucking air.

The suction unit 60 includes a pump 61, which is actuated by a motor PM (see FIG. 8C), and a pipe 62, which connects the pump 61 and the cap 45 to each other. The cap 45 is provided with suction ports 47 as suction portions, which are connected to the pipe 62 and open upward. The suction ports 47 are located on the rear side (Y1 side) of the discharge port Ha2 (see FIG. 4B) located at the rear (Y1-side) end of the discharge portion Ha when the recording head H is located at the front position. When the suction unit 60 sucks air at a negative pressure in a state in which the discharge portion Ha is covered with the cap 45 located at the covering position, ink adhering to the discharge portion Ha is sucked through the suction ports 47 to clean the discharge portion Ha.

After ink is wiped out by the cleaning blade 42, the discharge portion Ha is covered with the cap 45 to suppress drying of ink. At the same time, ink is sucked by the suction unit 60 to suppress clogging at the discharge ports of the discharge portion Ha due to fixing of the ink. As a result, the discharge portion Ha is maintained in a suitable ink-dischargeable state. The cleaning blade 42 and the suction ports 47, which are described above, form a cleaning portion C corresponding to cleaning means for cleaning the discharge portion Ha (discharge ports) of the recording head H.

[Controller]

FIG. 8C is a block diagram for illustrating a control configuration of the inkjet recording apparatus 100 according to the embodiment. The controller 50 includes a CPU, a RAM, and a ROM, which are not shown. The CPU controls portions and units while reading out a program corresponding to a control process, which is stored in the ROM. Further, working data and input data are stored in the RAM. The CPU performs control based on, for example, the above-mentioned program while referring to the data stored in the RAM. The controller 50 controls the motors and the recording head H based on input signals from sensors, switches, or the like.

For example, when the controller 50 detects, based on an input signal from the detection sensor 16 or the like, that the recording medium P is in a state of being positioned by the positioning unit R, the controller 50 lifts up the lifter 13 to press the recording medium P against the base plate 12. Further, for example, the controller 50 controls driving of the moving unit 30 (motor M) and the discharge of ink from the recording head H based on an input signal from the position detector E in a state in which the recording medium P is positioned by the positioning unit R. The position detector E outputs a signal in accordance with the amount of movement of the recording carriage unit 20 in the X direction.

In the embodiment, the controller 50 controls the position of the recording carriage unit 20 in the X direction by using a DC motor, the linear encoder 33, and the position detector E. The control performed by the controller 50 is not limited to that described above. The controller 50 may also control the position of the recording carriage unit 20 in the X direction by using a combination of a DC motor and a rotary encoder, a combination of a DC motor and a plurality of optical sensors arranged in the X direction, a stepping motor, or the like. Further, the controller 50 enables a head replacement mode for allowing a user to replace the recording head H, as described later in detail.

[Home Position and Replacement Position of Recording Head]

Next, the home position serving as a waiting position of the recording head H and the replacement position serving as a mounting and removal position are described with reference to FIG. 1, FIG. 2, FIG. 3, FIG. 5A, and FIG. 5B. The positions of the recording head H include the home position and the replacement position that are set to fall within the movement region extending in the X direction and the Y direction, within which the recording head H is movable. The home position of the recording head H (sub-carriage 22) is a waiting position when the inkjet recording apparatus 100 is in a powered-on state and in a standby state. The home position is the position of the recording head H (sub-carriage 22) at which the recording head H waits for next recording on the recording medium P, and serves as a start point at which the recording head H starts moving to perform the recording on the recording medium P.

More specifically, the home position of the recording head H is set at the right (X1-side) end of the movement region for the recording head H and the rear position in the movement region when the recording head H is located at a position in the X direction and the Y direction as illustrated in FIG. 3. As described above, while moving rightward (in the X1 direction), the recording head H starts moving rearward (in the Y1 direction) at a position on the right side (X1 side) of the recording-area opening 12*c*. Thus, when the recording head H is located at the home position, the recording head H is located on the right side (X1 side) of the recording-area opening 12*c*. Further, when the recording head H is located at the home position, the main carriage 21 is located at its home position. In other words, the recording area is located between positions of the plurality of discharge ports when the main carriage 21 is located at the home position and the positions of the plurality of discharge ports when the main carriage 21 is located at the replacement position. Further, in other words, when the main carriage 21 is located at either the home position or the replacement position, the discharge ports of the recording head H are located outside of the recording area.

After the recording head H performs recording in the backward way to complete recording on the recording medium P, the controller 50 controls the moving unit 30 to move the recording head H to the right (X1-side) end of the movement range so as to move the recording head H to the rear position. In the embodiment, after the completion of the recording, the recording head H is moved to the home position. When the recording head H reaches the cleaning blade 42, the cleaning blade 42 wipes out ink adhering to the discharge portion Ha. After the ink on the discharge portion Ha is wiped out, the recording head H is moved further rightward (in the X1 direction) by the moving unit 30 to reach the home position. When the recording head H reaches the home position, the recording head H stops moving and waits for next recording on the recording medium P. The recording head H is covered with the cap 45 when the recording head H is located at the home position, and ink on the discharge portion Ha is sucked by the suction unit 60.

The replacement position of the recording head H (sub-carriage 22) is a position of the recording head H (sub-carriage 22), which allows the user to replace the recording head H. More specifically, the replacement position of the recording head H is a position of the recording head H, which is illustrated in FIG. 1 and FIG. 2. The replacement position of the recording head H is set at the left (X2-side) end of the movement region for the recording head H in the X direction and at the front position (position on the Y2 side of the home position) in the movement region. As described above, while the recording head H moves leftward (in the X2 direction), the recording head H starts moving forward (in the Y2 direction) at a position on the left side (X2 side) of the recording-area opening 12*c*. Thus, when the recording head H is located at the replacement position, the recording head H is located on the left side (X2 side) of the recording-area opening 12*c*. When the controller 50 starts the head replacement mode described later, the motor M is driven to move the recording head H leftward (in the X2 direction) and forward (in the Y2 direction). Then, the recording head H reaches the replacement position. When the recording head H reaches the home position, the recording head H stops moving.

The base plate 12 has a cutout portion 12*d* serving as a non-interference portion, which has a cutout shape and is located below the recording head H when the recording head H is located at the replacement position. The cutout portion 12*d* is formed to extend to such an extent that contact between the recording head H and the base plate 12 can be avoided at a time of mounting and removal of the recording head H, which is achieved by moving up and down the front end side of the recording head H when the recording head H is located at the replacement position, and to such an extent that strength of the base plate 12 around the recording-area opening 12*c* is not reduced. For example, the cutout portion 12*d* is formed by cutting out the base plate 12 rearward (Y1 side) with respect to a front-side (Y2-side) end edge 12*g* of the base plate 12, which is located on the right side (X1 side) of the cutout portion 12*d*, so as not to be continuous with the recording-area opening 12*c*.

Further, for example, the cutout portion 12*d* is formed so that, when the front side (Y2 side) of the recording head H being located at the replacement position is moved downward (in the Z2 direction) in a state in which the recording head H remains in contact with the rear regulating portion of the sub-carriage 22, at least opening portions of the discharge ports are not brought into contact with the base plate 12. The non-interference portion is not limited to that having a cutout shape, and may also be formed so as to be recessed downward (in the Z2 direction).

In the embodiment described above, the cutout portion 12*d* is formed so as to be located below (on the Z2 side of) the recording head H when the recording head H is located at the replacement position. Thus, when the user mounts and removes the recording head H, the discharge ports or the discharge portion Ha can be prevented from being brought into contact with the base plate 12 and from being damaged thereby. Further, when the user mounts and removes the recording head H, a space for allowing a user's finger to rest on the bottom side (on the Z2 side) of the recording head H can be provided. Thus, workability at a time of maintenance such as a time of mounting and removal of the recording head H can be improved.

Further, the replacement position is set at a position outside the predetermined recording area. Thus, when the user mounts and removes the recording head H, deformation of the lower guide rail 12*e*, which is located in the vicinity of the recording area, is suppressed to allow satisfactory recording accuracy to be maintained. Further, the replacement position is set at a position apart from the cleaning blade 42. Thus, when the recording head H is replaced, adhesion of ink, which is scattered while the cleaning blade 42 is wiping out the ink, to a hand of the user can be suppressed.

[Cover Member]

Next, the cover member 3 is described with reference to FIG. 1. The cover member 3 is held so as to be mountable to and removable from the base 18. The cover member 3 has a front wall 3*a*, an opening 3*b*, and an openable and closable door 9. The openable and closable door 9 can open and close the opening 3*b*. The cover member 3 covers an upper side (Z1 side), a left side (X2 side), a right side (X1 side), a front side (Y2 side), and a rear side (Y1 side) of the movement region for the recording head H, and covers and protects components inside the cover member 3. The front wall 3*a* corresponding to a wall portion is located on a front side (Y2 side) of the movement region for the recording head H and the space T1 (see FIG. 7A) in which the cleaning portion C is located, and separates the space T1 and an outside space T2 from each other in the front-rear direction (Y direction). Further, the front wall 3*a* is located on the rear side (Y1 side) of a front (Y2-side) end of the support plate 11 that supports the recording medium P. In other words, the support plate 11 protrudes forward (to the Y2 side) beyond the front wall 3*a*.

In the embodiment described above, when a user inserts the recording medium P into the insertion port S in a state in which the recording medium P is placed on the support plate 11 so that the rear side (Y1 side) is located on a protruding portion of the support plate 11 beyond the front wall 3*a*, the recording medium P is guided by the support plate 11. Thus, workability at a time of recording on the recording medium P can be improved.

Further, in the embodiment described above, the cleaning unit 40 is arranged so that, when the recording head H is located at the home position at which the recording head H is located at the rear position in the Y direction, the discharge portion Ha is cleaned with the cleaning blade 42 and is covered with the cap 45. As a result, in comparison to a case in which the cleaning unit 40 is arranged so as to clean and cover the discharge portion Ha of the recording head H when the recording head H is located at the front position, the cover member 3 can be formed and arranged so that the front wall 3*a* is located on the rear side. Thus, the apparatus can be downsized by reducing a size of a peripheral portion around the cleaning unit 40.

Further, in this manner, the cover member 3 can be arranged so that the front wall 3*a* is located on the rear side. Thus, when a user manually inserts the recording medium P into the insertion port S, a user's hand is less liable to come into contact (interfere) with the front wall 3*a*. Thus, workability at a time of recording on the recording medium P can be improved.

In the embodiment, the support plate 11 is arranged on the left side (X2 side) of the right regulating surface 12*a*, and the cleaning unit 40 is arranged on the right side (X1 side) of the right regulating surface 12*a*. However, positions of the support plate 11 and the cleaning unit 40 are not limited to those described above. The cleaning unit 40 is only required to be arranged on the side opposite to the right regulating surface 12*a*. However, when the recording medium P is placed in the insertion port S and a user is supposed to be right-handed, it is preferred that the support plate 11 be arranged on the left side (X2 side) of the right regulating surface 12*a* and the cleaning unit 40 be arranged on the right side (X1 side) of the right regulating surface 12*a*.

The opening 3*b* is formed at a position on the front side (Y2 side) and the left side (X2 side) of the cover member 3, and exposes the front side (Y2 side) and an upper side (Z1 side) of the recording head H when the recording head H is located at the replacement position. The openable and closable door 9 is provided so that a user can manually open and close the opening 3*b*. In a state in which the openable and closable door 9 is opened (open state), the front side (Y2 side) and the upper side (Z1 side) of the recording head H located at the replacement position are exposed to allow a user to mount and remove the recording head H through the opening 3*b*. Further, an open/close sensor 8 (see FIG. 1) configured to detect the open state and a closed state of the openable and closable door 9 is provided to the cover member 3. The open/close sensor 8 outputs a signal in accordance with the open/closed state of the openable and closable door 9 to the controller 50.

In the embodiment described above, at the replacement position at which the sub-carriage 22 is located at the front position, the recording head H is allowed to be mounted and removed. Thus, a worker can easily access the recording head H, and the holding portion for the recording head H can easily be viewed from the front side (Y2 side). Still further, workability at a time of maintenance such as mounting and removal of the recording head H can be improved. Further, at the replacement position at which the sub-carriage 22 is located at the front position, the recording head H can be mounted and removed through the opening 3*b* in the inkjet recording apparatus 100 according to the embodiment. Thus, a distance from the opening 3*b* to the recording head H in the Y direction is small, improving the workability at a time of mounting and removal of the recording head H. In particular, when the inkjet recording apparatus 100 has a structure that does not allow the openable and closable door 9 to be opened wide, a high effect of improving the workability is obtained.

[Head Replacement Mode]

Figure 9:
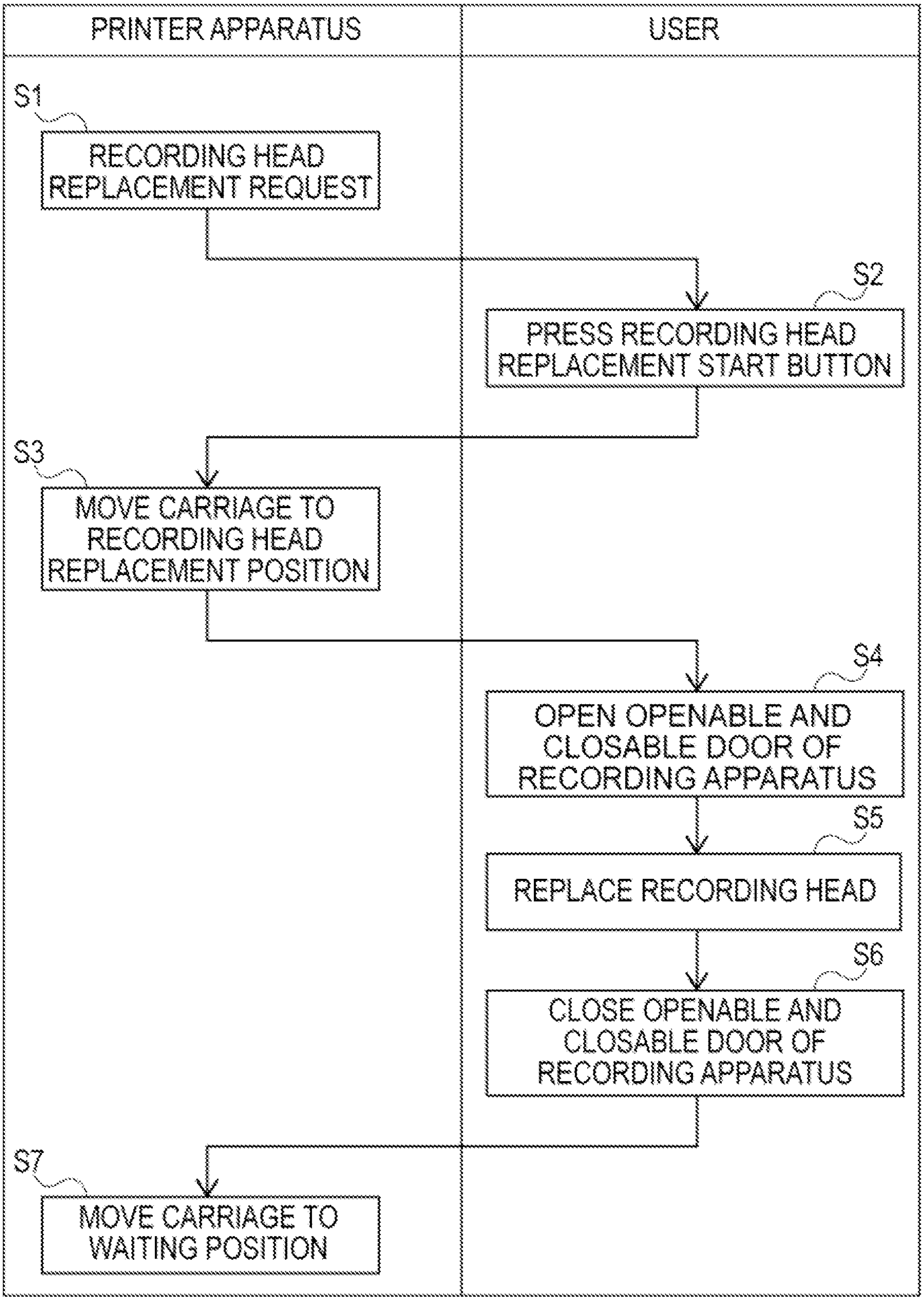
FIG. 9 is a flowchart for illustrating a head replacement mode and an operation performed by a user.

Next, a head replacement mode performed by the controller 50 based on a predetermined input signal is described with reference to FIG. 1, FIG. 3, and FIG. 9. For example, when a signal indicating that a remaining amount of ink in the ink cartridge is small or ink has been used up is input from the recording head H to the controller 50, the controller 50 notifies (makes a recording head replacement request to) a user that a remaining amount of ink in the ink cartridge is small or ink has been used up (S1). For example, the controller 50 turns on a lamp provided at a predetermined position in the apparatus. Then, when, for example, the user operates a recording head replacement start button of the apparatus or touches an icon on a liquid crystal panel (an instruction is input) so as to replace the recording head H (S2), the controller 50 starts the head replacement mode for replacing the recording head H.

The recording head replacement request for requesting a user to replace the recording head H may be displayed on a liquid crystal display, which is, for example, provided to the apparatus or a PC connected to the apparatus, or may be an audio error message or an error sound given out through a speaker. Further, the controller 50 may output the recording head replacement request in accordance with, for example, a signal indicating that total usage time of the recording head H has reached predetermined time, a signal indicating that the amount of recording has reached a predetermined amount, or a signal indicating an abnormality of the recording head H other than a remaining amount of ink.

When the user presses the recording head replacement start button (not shown) after the recording head replacement request is output, that is, an instruction for an operation of removing a recording head is input (S2), the controller 50 controls, based on, for example, the input signal from the recording head replacement start button, the moving unit 30 to move the sub-carriage 22 to the left (X2-side) end of the movement range in the X direction so as to move the sub-carriage 22 to the replacement position (S3). In a state in which the recording head H is located at the replacement position, the user opens the openable and closable door 9 (S4). After the recording head H is replaced (S5), the openable and closable door 9 is closed (S6).

When the open/close sensor 8 detects that a state of the openable and closable door 9 has changed from the open state to the closed state, the controller 50 controls the moving unit 30 to move the sub-carriage 22 to the right (X1-side) end of the movement range so as to move the sub-carriage 22 to the home position (S7).

As described above, in the embodiment, the controller 50 performs the head replacement mode based on, for example, the fact that a remaining amount of ink is small or that ink has been used up, and moves the recording head H to the replacement position at which the recording head H is easily mounted and removed. At the time of movement of the recording head H, the sub-carriage 22 is moved to the replacement position based on, rather than a result of detection performed by the open/close sensor 8, pressing of the recording head replacement start button. Thus, when the openable and closable door 9 is unintentionally brought into an open state in response to, for example, contact with a user, malfunction does not occur. Then, the sub-carriage 22 is moved to the home position based on a change in state of the openable and closable door 9 from the open state to the closed state. Thus, workability at a time of maintenance such as replacement of the recording head H performed by a user can be improved.

The present invention is not limited to the embodiments described above, and various changes and modifications can be made without departing from the spirit and scope of the present invention. The following claims are appended hereto in order to make the scope of the present invention public.

This application claims the benefit of Japanese Patent Application No. 2019-194621 filed on Oct. 25, 2019 and Japanese Patent Application No. 2020-161217 filed on Sep. 25, 2020, which are hereby incorporated by reference herein in their entirety.

REFERENCE SIGNS LIST

8 . . . open/close sensor, 9 . . . door (openable and closable door), 12 . . . base plate (plate member), 12*d* . . . cutout portion (non-interference portion), 12*c* . . . recording-area opening (opening portion), 13 . . . lifter (support portion), 12*b* . . . regulating portion (rear regulating surface), 21 . . . main carriage, 22 . . . sub-carriage, 23 . . . slide member (sub-moving means), 30 . . . moving unit (main moving means), 50 . . . controller (control means), 100 . . . inkjet recording apparatus (recording apparatus), H . . . recording head, P . . . recording medium, S . . . insertion port, X . . . first direction (right-and-left direction), Y . . . second direction (front-rear direction)

The invention claimed is:

1. A recording apparatus comprising:

a recording head including a discharge portion configured to discharge ink to perform recording;

a plate disposed at a predetermined distance from the discharge portion, the plate having an opening portion;

a lifter configured to lift a recording medium toward the plate, the lifter being configured to hold the recording medium between the plate and the lifter so that the recording medium is exposed from the opening portion;

an operation portion which is operated by a user to input a removing instruction for removing the recording head from the recording apparatus; and a carriage configured to removably hold the recording head, wherein the carriage moves relative to the plate so that the recording is performed through the opening portion, wherein the carriage moves the recording head to a replacement position according to the removing instruction, and wherein the discharge portion is outside the opening portion when the recording head is in the replacement position.

2. The recording apparatus according to claim 1, further comprising a cap configured to abut against a periphery of the discharge portion to cover the discharge portion when the recording apparatus is in a standby state, the cap being disposed outside of the plate in a right-and-left direction of the recording apparatus.

3. The recording apparatus according to claim 2, wherein the replacement position is on an opposite side of the cap across the opening portion in the right-and-left direction.

4. The recording apparatus according to claim 1, wherein the carriage is movable in a right-and-left direction of the recording apparatus, and wherein the recording head is enabled to perform the recording when the carriage is being moved in a left direction of the recording apparatus and when the carriage is being moved in a right direction of the recording apparatus.

* * * * *